Dec. 18, 1934.  W. OWEN  1,984,942
APPARATUS FOR MAKING INSULATING GLASS
Filed Aug. 5, 1933   2 Sheets-Sheet 1
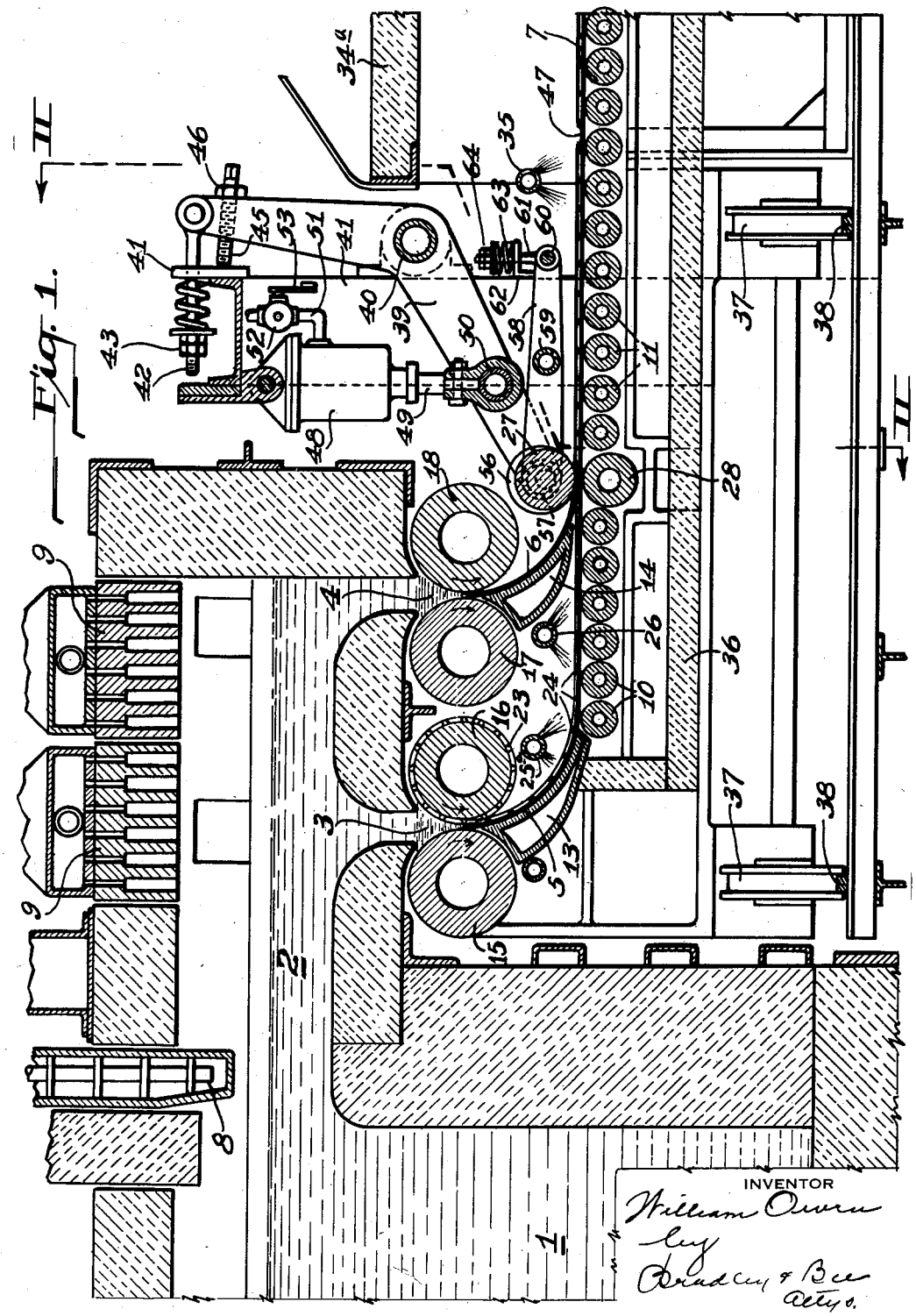

Dec. 18, 1934. W. OWEN 1,984,942
APPARATUS FOR MAKING INSULATING GLASS
Filed Aug. 5, 1933 2 Sheets-Sheet 2
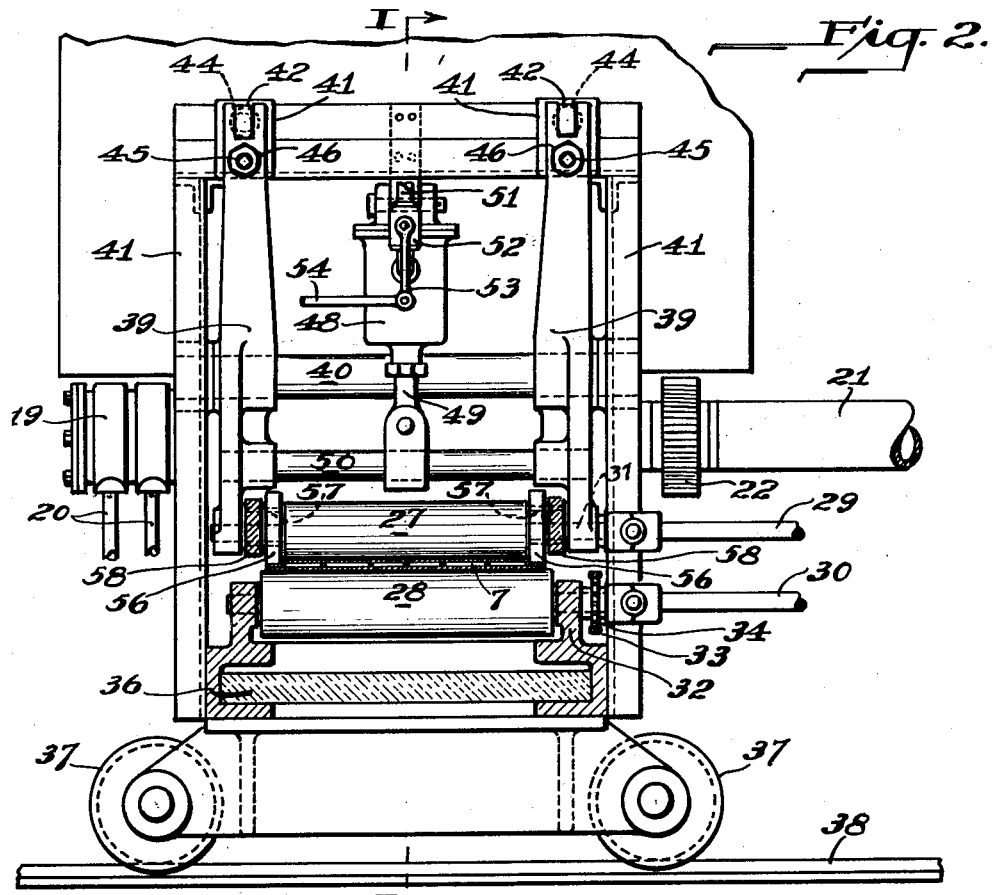
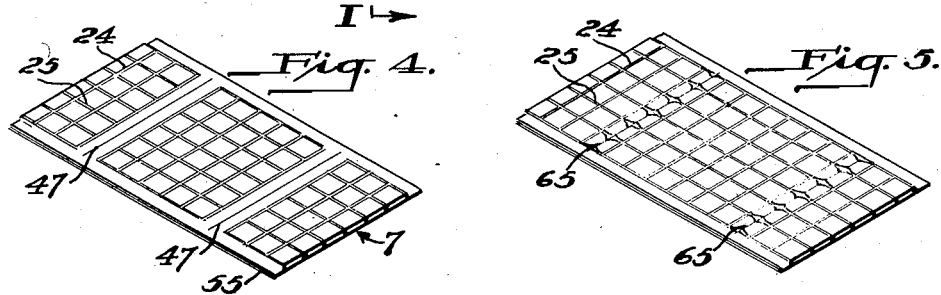
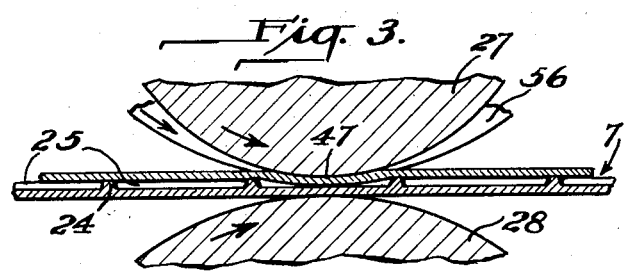
INVENTOR Patented Dec. 18, 1934

1,984,942

UNITED STATES PATENT OFFICE 1,984,942

APPARATUS FOR MAKING INSULATING GLASS

William Owen, Pittsburgh, Pa., assignor to Pittsburgh Plate Glass Company, a corporation of Pennsylvania Application August 5, 1933, Serial No. 683,874

9 Claims. (Cl. 49—3)

The invention relates to apparatus for making insulating glass by a continuous process. Such glass comprises a plate formed from a pair of rolled sheets with air pockets therebetween, and the present apparatus has for its principal objects the provision of improved means for thinning the side edges of the plate to provide glazing margins, and for thinning the plate transversely at spaced intervals to provide grooves for facilitating the subsequent severing of the plate into sections and also to give glazing margins at the ends of the sections. A further object is the provision of a very simple compact apparatus which will operate effectively to accomplish the functions above stated. One embodiment of the invention is illustrated in the accompanying drawings, wherein:

Figure 1 is a vertical section through the apparatus on the line I—I of Fig. 2. Fig. 2 is a transverse section through the apparatus on the line II—II of Fig. 1. Fig. 3 is an enlarged detail view. Fig. 4 is a perspective view of the continuous plate which is formed by the apparatus. And Fig. 5 is a view similar to that of Fig. 4 involving a modification.

Referring to the drawings, 1 is a glass melting tank and 2 is an extension provided in its bottom with a pair of outlet openings 3, 4, through which glass is supplied to form the two sheets 5 and 6 which go to make up the final completed plate 7. The forehearth is provided with a water cooled cut off gate 8 by means of which the flow of glass to the forehearth may be interrupted when it becomes necessary to make repairs in the forehearth or in the rolling apparatus connected therewith. Gas burners 9, 9 are provided above the surface of the glass in the forehearth for maintaining such glass at a proper temperature.

Two sets of rollers 10 and 11 are provided for carrying the glass laterally into a roller leer to the right of the apparatus shown, the glass being severed into sections after it has been annealed and reduced to cutting temperature in the leer. In order to support the glass sheets in their passage from the forming rolls to the supporting rolls 10 and 11, the aprons 13 and 14 are provided, such aprons being hollow and suitably cooled by air or water.

The sheet 5 is formed between the rolls 15 and 16, while the sheet 6 is formed between the rolls 17 and 18. These rolls are hollow and are water cooled by means of a circulation of water therethrough, this being accomplished by the use of swivels 19 at the ends of the rolls provided with water circulating pipes 20, as indicated in Fig. 2.

One member of each pair of rolls is driven by means of a tumbler shaft 21 and the ends of each pair of rolls are provided with intermeshing spur gears 22 so that the members of each pair are driven in opposite directions, as indicated by the arrows. The roll 15 has a plain surface, but the opposing roll 16 is provided with longitudinal and transverse grooves 23 so that the sheet 5 as formed by the roll has on its surface the two sets of intersecting ribs 24 and 25 with recesses between the ribs. When the two sheets 5 and 6 are joined together to form an integral plate, the recesses provide air pockets to give the insulating effect. The sheets are brought together while still at a temperature high enough to cause them to weld, the temperature of the sheet 5 being maintained by means of a pair of gas burners 25a and 26.

Pressure is applied to the two sheets just after they are brought into contact by means of the roll 27 which is placed in opposition to the supporting roll 28. These rolls are preferably driven by means of the tumbler shafts 29 and 30, such shafts being connected to the axles 31, 32 of the two rolls. Suitable driving mechanism for the shafts 29 and 30 (not shown) is provided and such rolls are driven at the same peripheral speed as the supporting rolls 10 and 11. The rolls 10 and 11 are provided at their ends with the usual sprockets and are driven by a chain 33 which passes around such sprockets and around the sprocket 34 on the shaft 32. A cover 34a is preferably employed above the plate and extending forwardly to the leer. This serves to maintain the temperature of the plate as it passes to the leer and, if desired, additional burners 35 may be employed to assist in maintaining this temperature. The forming rolls, as well as the rolls for forwarding the sheet, are all preferably mounted upon a truck body 36 provided with wheels 37 and such wheels are mounted upon a track 38, so that when desired, this part of the apparatus can be removed laterally from beneath the end of the forehearth 2. This is a matter of convenience when replacements or repairs are required.

The roll 27 has its axle 31 journalled in a pair of angular lever arms 39 pivoted at 40 upon a suitable standard 41, such standard also being carried by the truck body 36. Connected to the top of the standard is a bracket 41 and through this bracket extends the rods 42 pivoted to the upper ends of the lever arms 39. These rods are provided with nuts 43 and springs 44 are provided between such nuts and the brackets 41. This gives a means for increasing the pressure of the roll 27 upon the glass. In order to limit the downward movement of the roll 27, and thus define the thickness of the plate with exactness, the stop screws 45 are provided at the upper ends of the lever arms 39, such stop screws having their inner ends in engagement with the face of the bracket 41. The stop screws are threaded through the arms so that they may be adjusted and lock nuts 46 are provided for securing the screws in adjusted position.

In addition to providing continuous pressure upon the plate 7 to promote the welding action, the roll 27 performs a further function which consists in thinning the plate at intervals, as indicated at 47. The purpose of this thinning is two-fold, namely to permit the glass to be cut into sections without difficulty and to give glazing margins at the edges of the sections. These thinned glazing margins are desirable, as the body of the glass is relatively thick, and if the edges were not thinned, a very thick, bulky sash would be required. In order to secure the thinning action by the roll 27, means are provided for pressing it down at the desired intervals. The means preferably employed is an air cylinder 48, whose plunger 49 is secured to the tie rod 50 which extends from one of the lever arms 39 to the other. The upper end of the air cylinder 48 is rigidly bolted to the supporting standard or framework 41. Air is admitted above the cylinder by means of a pipe 51 having a three-way valve 52. The valve plug is provided with a handle 53 to which is connected an operating rod 54. This rod 54 is connected to a suitably timed operating means, so that the valve is operated to secure the downward movement of the roll 27 at the desired intervals, the three-way valve acting to release the air from above the piston in the cylinder after the valve handle 53 has been swung through a portion of its arc.

The apparatus also includes means for thinning the side edges of the plate 7, as indicated at 55 (Fig. 4), so that glazing margins are provided at the side edges of the glass sections as well as at the end edges. This thinning means for the side edges of the sheet comprises a pair of edge rollers 56, 56 which are in alignment with the roll 27. These rolls are mounted on hollow bushings 57, 57 (Fig. 2) and the inner ends of such bushings are secured in the ends of a pair of arms 58, 58 pivoted upon the truck body at 59. The rear ends of these arms are connected by a transverse rod 60 and to this rod is pivoted a rod 61. The rod 61 extends through the bracket 62 carried by the standard 41, and a spring 63 is interposed between such bracket and a nut 64 carried on the end of the rod 61. By adjusting the nut 64, the spring 63 is tensioned so that the edge rolls 56, 56 apply the amount of pressure necessary to produce the required thinning of the edges 55 of the plate. The shaft 31 of the roll 27 extends through the hollow bushings, and the inside diameter of these bushings is such that they do not interfere with the up and down movement of the roll 27 when it is operated by the air cylinder. This expedient of employing the hollow bushings permits the edge rolls 56, 56 to be placed in alignment with the roll 27, which is a desirable arrangement, since this permits the rolling operation as performed by the rolls 27 and 56 to occur as close as possible to the point at which the glass sheets are formed. As a result, there is less loss in the temperature of the glass before this welding and rolling operation occurs.

In forming the sheet 5, the longitudinal ribs 25 are preferably interrupted at the points at which the glass is to be thinned by the transverse roller 27, so that this thinning operation is more easily accomplished than if the ribs 25 were continuous. This form of construction is illustrated in Fig. 4, but it is possible to carry out the operation upon a sheet in which the longitudinal ribs 25 are continuous and this type of construction is indicated in Fig. 5, in which the flattening at 65 has involved a pressing down of the longitudinal ribs as well as the thinning of the other portions of the sheets.

What I claim is:

1. Apparatus for making insulating glass, comprising means for continuously forming two sheets of glass and bringing them together while still plastic to form a continuous integral plate, said means being provided with projections to form air pockets in said plates, a support for the plate therebeneath, a transverse roll in opposition to the support, and means for intermittently raising and lowering the roll to thin the plate at intervals to facilitate the subsequent severing of the plate into sections and to give glazing margins at the ends of the sections.

2. Apparatus for making insulating glass, comprising means for continuously forming two sheets of glass and bringing them together while still plastic to form a continuous integral plate, said means being provided with projections to form air pockets in said plate, a supporting roll extending transversely of the plate therebeneath, a second roll in parallel with the first roll thereabove, and means for intermittently raising and lowering the second roll to thin the plate at intervals to facilitate the subsequent severing of the plate into sections and to give glazing margins at the ends of the sections.

3. Apparatus for making insulating glass, comprising means for continuously forming two sheets of glass and bringing them together while still plastic to form a continuous integral plate, said means being provided with projections to form air pockets in said plate, a support for the plate therebeneath, a transverse roll in opposition to the support, means for intermittently raising and lowering the roll to thin the plate at intervals to facilitate the subsequent severing of the plate into sections and to give glazing margins at the ends of the sections, and independent rolls in opposition to the support at the side edge of the plate applying continuous pressure to thin the plate along its side edges to provide glazing margins along such edges.

4. Apparatus for making insulating glass, comprising means for continuously forming two sheets of glass and bringing them together while still plastic to form a continuous integral plate, said means being provided with projections to form air pockets in said plate, a support for the plate therebeneath, a transverse roll in opposition to the support, applying continuous pressure to the plate, and means for forcing the roll downward at intervals to apply additional pressure to thin the plate to facilitate the subsequent severing of the plate into sections and to give glazing margins at the ends of the sections.

5. Apparatus for making insulating glass, comprising means for continuously forming two sheets of glass and bringing them together while still plastic to form a continuous integral plate, said means being provided with projections to form air pockets in said plate, a supporting roll extending transversely of the plate therebeneath, a second roll in parallel with the first roll thereabove arranged to apply pressure continuously to the plate, and means for forcing the second roll downward at intervals to apply additional pressure to thin the plate to facilitate the subsequent severing of the plate into sections and to give glazing margins at the ends of the sections.

6. Apparatus for making insulating glass, comprising means for continuously forming two sheets of glass and bringing them together while still plastic to form a continuous integral plate, said means being provided with projections to form air pockets in said plate, a support for the plate therebeneath, a transverse roll in opposition to the support, means for lowering the roll to apply additional pressure to thin the plate at intervals to facilitate the subsequent severing of the plate into sections and to give glazing margins at the ends of the sections, and independent rolls in opposition to the support at the side edge of the plate in alignment with the ends of the first roll, applying continuous pressure to thin the plate along its side edges to provide glazing margins along such edges.

7. Apparatus for making insulating glass, comprising means for continuously forming two sheets of glass and bringing them together while still plastic to form a continuous integral plate, said means being provided with projections to form air pockets in said plate, a support for the plate therebeneath, a transverse roll in opposition to the support, power means for forcing the roll downward and lift it intermittently to thin the plate at intervals to facilitate the subsequent severing of the plate into sections and to give glazing margins at the ends of the sections, and stop means for limiting such downward movement of the roll.

8. Apparatus for making insulating glass, comprising means for continuously forming two sheets of glass and bringing them together while still plastic to form a continuous integral plate, said means being provided with projections to form air pockets in said plate, a support for the plate therebeneath, a transverse roll in opposition to the support, yielding means forcing the roll downward continuously, power means for intermittently forcing the roll downward still further to thin the plate at intervals to facilitate the subsequent severing of the plate into sections and to give glazing margins at the ends of the sections, and stop means for limiting such downward movement of the roll.

9. Apparatus for making insulating glass, comprising means for continuously forming two sheets of glass and bringing them together while still plastic to form a continuous integral plate, said means being provided with projections to form air pockets in said plate, a support for the plate therebeneath, a transverse roll in opposition to the support, means for lowering the roll intermittently to thin the plate at intervals to facilitate the subsequent severing of the plate into sections and to give glazing margins at the ends of the sections, independent rolls in opposition to the support at the side edges of the plate, and means for applying yielding pressure to said independent rolls to force them downward so as to thin the plate along its side edges to provide glazing margins along such edges.

WILLIAM OWEN.